June 22, 1943.  G. T. KANEB  2,322,730

BEAD STRINGING

Filed April 16, 1942

INVENTOR
George T. Kaneb
BY
Oswald G. Hayes
ATTORNEY

Patented June 22, 1943

2,322,730

UNITED STATES PATENT OFFICE 2,322,730

BEAD STRINGING

George T. Kaneb, Woodbury, N. J., assignor to Socony-Vacuum Oil Company, Incorporated, a corporation of New York Application April 16, 1942, Serial No. 439,247

2 Claims. (Cl. 223—48)

This invention relates to method and means for stringing of beads and is particularly concerned with stringing of beads having at least one convex end and comparatively long sides parallel to the hole through the bead.

The invention is particularly useful in making up long strings of beads, for example, stringing of insulating beads on resistance wire for heating units. The beads generally used for this specific purpose have a concave end and a convex end and considerable time is required for making up insulated strings. With beads that run about 6 per inch of wire, a man can string 64 feet of wire in 8 hours manually. By the use of my invention the rate can be increased at least 3 to 5 times.

The apparatus used is extremely simple and may be fashioned from materials available in practically any laboratory. A trough of a size suitable to the beads to be strung is mounted to slope along its length and provided with means for agitation, preferably vibration in the direction of length. Beads are fed to the upper end of the trough and permitted to flow down the trough under the influence of the agitation thereof. The sides of the trough tend to orient the beads longitudinally with the hole parallel to the direction of travel. Where the beads are convex at one end and concave at the other, they will tend to roll on the convex end if that is lowermost and all the beads will be oriented with the concave end first as they approach the lower end of the trough. This is highly advantageous since it is much easier to insert a wire or needle in the concave end than in the convex end as will be readily understood.

Other objects and advantages of the invention will be apparent from the description herein of a preferred embodiment illustrated in the annexed drawing wherein.

Figure 1:
Figure 1 is a view of the type of bead to which the invention is best adapted.
Figure 2:
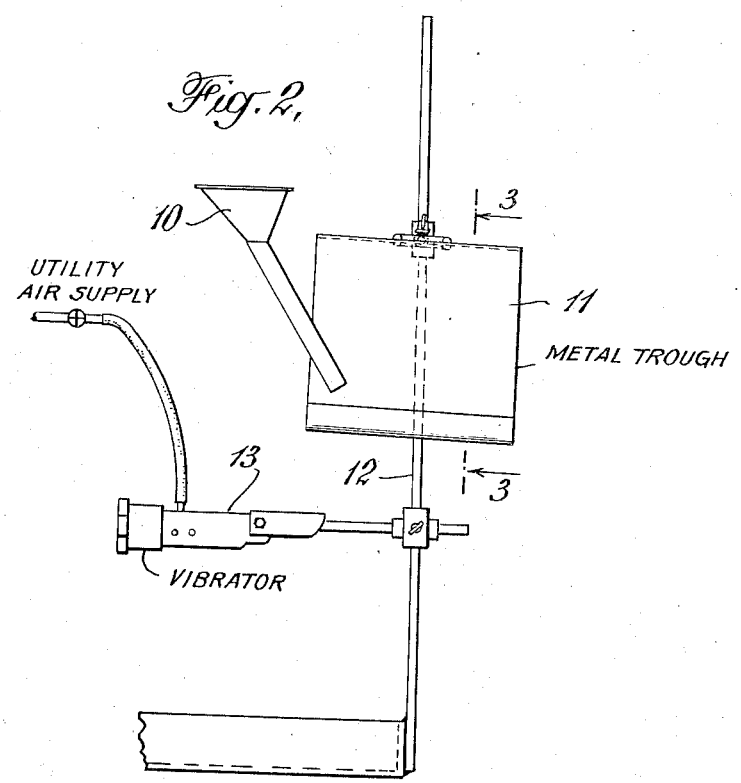
Figure 2 is a view, somewhat diagrammatic of an assembly suitable for practicing the invention.
Figure 3:
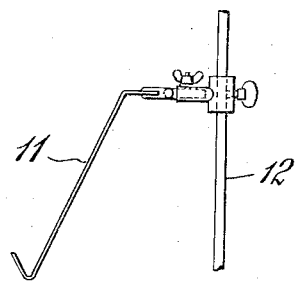
Figure 3 is a view in section taken along the line 3—3 of Figure 2.

As will be seen from Figure 1, the insulation beads to which the invention is particularly well adapted are formed as cylinders with one convex and one concave end. Beads of this type (or other types having straight sides of substantial length) are fed from a funnel 10 to a trough 11 mounted on any suitable support such as burette stand 12. Means are provided for agitating the assembly such as the vibrator 13 driven by a compressed air motor. The trough 11 is inclined in the direction of its length and the beads are fed thereto at the upper end thereof.

The operator holds a wire, or a needle if the beads are to be strung on thread, at the lower end of the trough and inserts it in the beads of the stream of beads in the trough. Beads may be strung in this fashion with great rapidity since all the operator need do is hold the end of the wire or needle in position and push the strung beads back on the wire or thread as rapidly as strung.

I claim:

1. A bead stringing device for use in stringing beads having sides of substantial length parallel to the holes therethrough and having one convex and one concave end, which comprises; an elongated trough shaped member, open at its top throughout its length, extending approximately horizontally, but slightly inclined in the direction of its length; means for feeding beads to the upper end of said trough; and means for agitating said trough.

2. A bead stringing device for use in stringing beads having sides of substantial length parallel to the holes therethrough and having one convex and one concave end, which comprises; an elongated trough shaped member, open at its top throughout its length, extending approximately horizontally, but slightly inclined in the direction of its length; means for feeding beads to the upper end of said trough; and means for vibrating said trough in the direction of its length.

GEORGE T. KANEB.